Oct. 8, 1957      R. O. BIRCHLER      2,809,271
APPARATUS FOR SELECTIVELY FORMING AND
WELDING CONTACTS ONTO RELAY PARTS Filed Jan. 31, 1956      7 Sheets-Sheet 7

INVENTOR
R. O. BIRCHLER
BY C.B. Hamilton
ATTORNEY

United States Patent Office 2,809,271
Patented Oct. 8, 1957

2,809,271

APPARATUS FOR SELECTIVELY FORMING AND WELDING CONTACTS ONTO RELAY PARTS

Robert O. Birchler, Cicero, Ill., assignor to Western Electric Company, Incorporated, New York, N. Y., a corporation of New York Application January 31, 1956, Serial No. 562,387

15 Claims. (Cl. 219—79)

This invention relates to apparatus for selectively forming various types of contacts and selectively welding the contacts onto conductors of a relay part.

This invention is an improvement of the welding apparatus disclosed in the co-pending application, Serial No. 347,335, filed April 7, 1953, now Patent No. 2,749,419, issued June 5, 1956, and is also related to co-pending applications, Serial Nos. 562,388 and 562,405, filed concurrently.

An object of the present invention is to provide an apparatus for selectively welding contacts onto elements of an article.

Another object of the present invention is to provide an apparatus for forming contacts and selectively welding them onto conductors of an electrical component.

Another object of the invention is to provide an apparatus for selectively forming different types of contacts and welding them onto selected conductors of a relay part.

An apparatus illustrating certain features of the invention may include a tape feeding mechanism for individually advancing different kinds of contact tape into a tape shearing mechanism for shearing contacts therefrom and moving them into the path of a transfer mechanism for transferring the contacts to a reciprocable welding electrode which moves the contacts individually into impact engagement with selected wires of a relay part positioned in the path of the electrode to effect the percussive welding of the contacts onto the wires. The tape feeding mechanism, tape shearing mechanism, contact transfer mechanism, and the welding electrode are actuated in a predetermined sequence by a drive shaft which is driven through one-revolution cycles.

The relay part is supported on a carriage which is advanced by an indexing mechanism into predetermined positions to locate successive wires on the relay part in welding position in alignment with the welding electrode. Control means are provided including a switch for each position of the carriage, which switches are individually settable to different positions for selectively controlling the indexing of the carriage to selected predetermined positions and the actuation of the drive shaft when the carriage is at the selected predetermined positions to effect the forming of contacts and the welding of the contacts onto the selected wires of the relay part.

The tape feeding mechanism includes three tape feeding devices individually actuated by a cam which is normally aligned with the center tape feeding device and is shiftable into alignment with the other tape feeding devices to render the selected tape feeding device operable. Tape selector control means are provided including a switch for each position of the carriage, which switches are individually settable to different positions and selected ones of the switches are operative when the carriage is at the selected predetermined positions for selectively rendering the tape feeding devices operative to feed selected types of tapes. After the contacts have been welded onto the relay part the indexing mechanism returns the carriage to its first position and a conveyor is actuated to remove the relay part from the carriage and feed another relay part thereonto.

Other objects and advantages of the invention will become apparent by reference to the following detailed description and the accompanying drawings illustrating a preferred embodiment thereof, in which.

Figures 7, 8, 9:
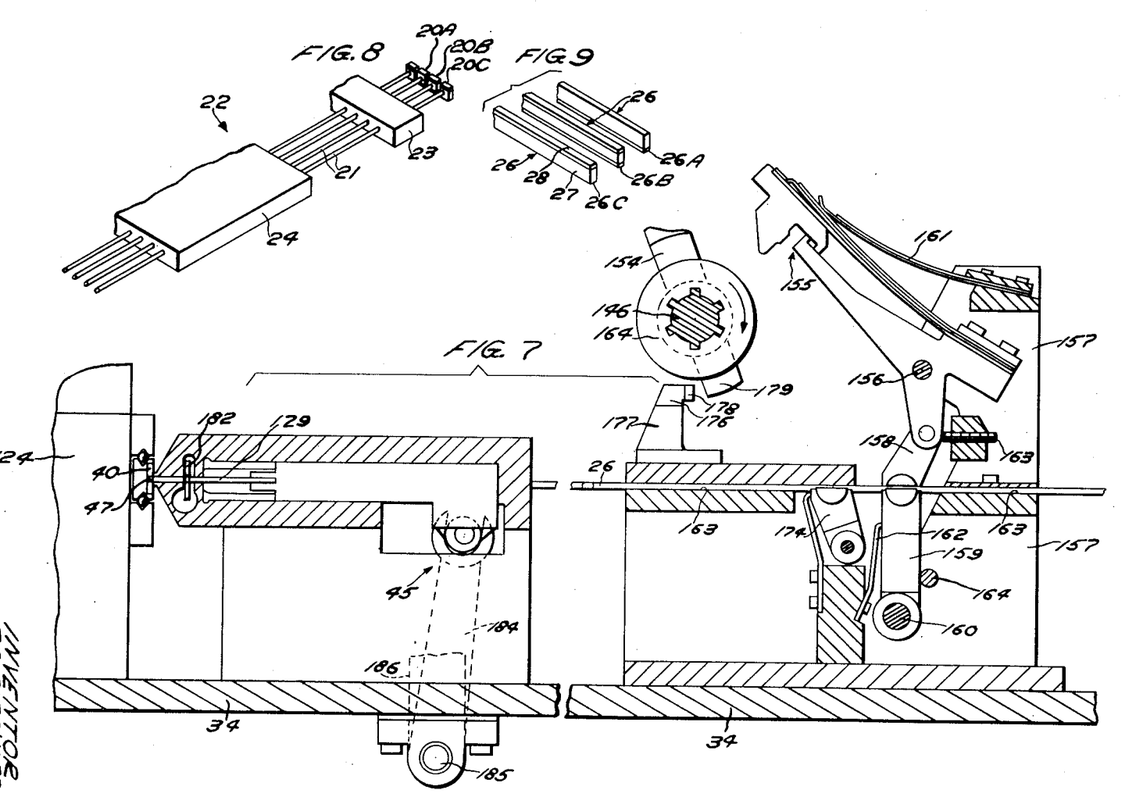
Fig. 7 is an enlarged fragmentary vertical longitudinal sectional view of the apparatus taken on line 7—7 of Fig. 1.
Fig. 8 is an enlarged fragmentary perspective view of the relay part having a plurality of wires with selected contacts welded thereto by the apparatus of the present invention.
Fig. 9 is an enlarged fragmentary perspective view of three different types of contact tapes from which contacts may be formed.
Figures 12, 13:
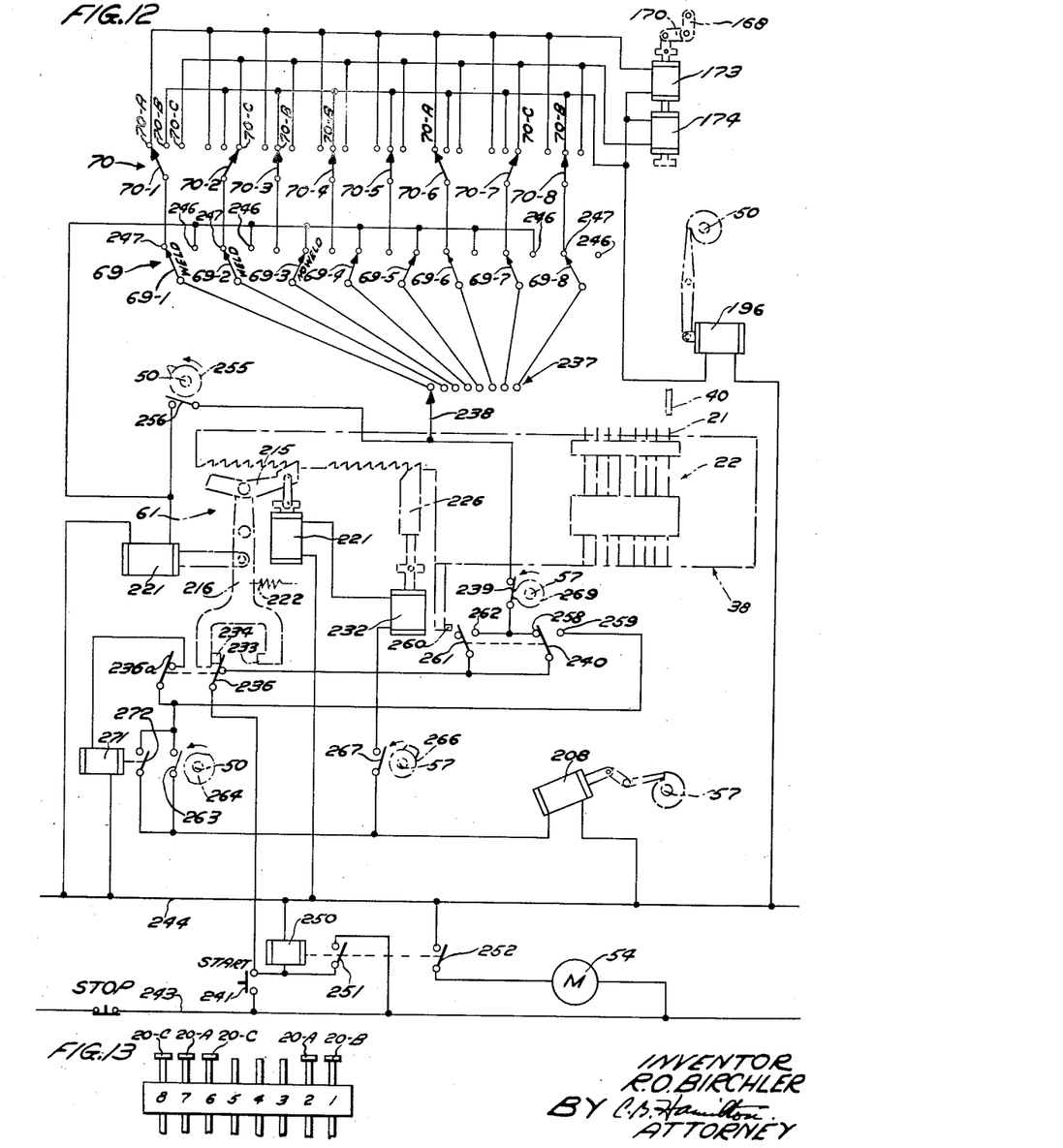
Fig. 12 is a schematic view of the electric control system of the apparatus for selectively forming different kinds of contacts and welding them onto selective wires of the relay part.
Fig. 13 is an enlarged fragmentary view of the relay part showing selected types of contacts welded onto selected wires thereof.

The present welding apparatus is designed for selectively welding contacts 20 onto the ends of all or selected wires 21 of a relay part or article 22 (Figs. 8 and 13). The wires 21 are disposed in a row in parallel and laterally spaced relation to each other and are secured in molded blocks 23 and 24 of dielectric material. The contacts 20 are sheared from tapes 26 of metal comprising a body 27 of base metal such as cupro-nickel and a cap or layer 28 of precious metal such as palladium bonded thereto. The tapes and contacts are of three types, 26-A, 26-B, 26-C and 20-A, 20-B, 20-C, one with the cap 28 bonded onto the top, one with the cap bonded onto both the top and bottom, and one with the cap bonded onto the bottom.

Figure 5:
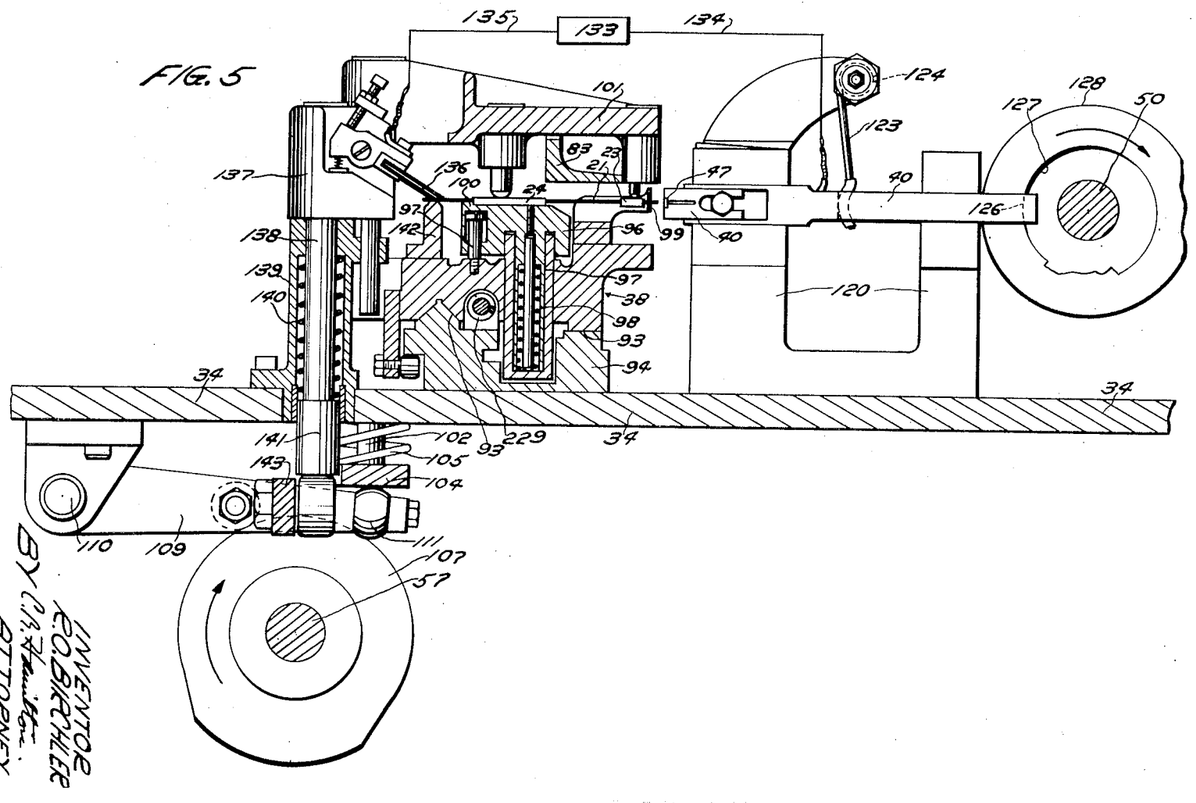
Fig. 5 is an enlarged fragmentary vertical cross-sectional view of the apparatus taken on line 5—5 of Fig. 1.
Figure 11:
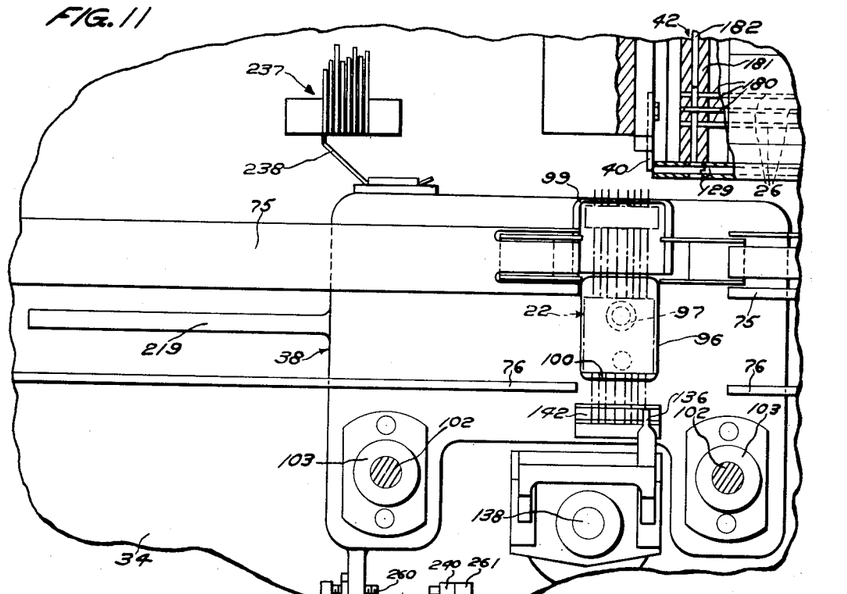
Fig. 11 is an enlarged fragmentary plan sectional view of the apparatus taken on line 11—11 of Fig. 10.

Generally, the apparatus comprises a frame having a horizontally disposed base plate 34 (Fig. 1) on which the various machine components are mounted, including a conveyor 36 for intermittently advancing the articles 22 individually onto a carriage 38 on which the article 22 is clamped with the first wire 21 thereof in a welding position in alignment with a movable electrode or gun 40 (Figs. 5 and 11) for welding a contact 20 thereon. The tapes 26 are individually and selectively advanced by a tape feeding mechanism 41 into a tape shearing mechanism 42 which shears a contact 20 therefrom, which contact is carried by a transfer mechanism 45 into a notch 47 in the electrode.

The electrode 40 is operatively connected to and actuated by a main drive shaft 50 which is driven from a motor 54 (Fig. 6) through means including a solenoid actuated one-revolution clutch 55. The selective tape feed mechanism 41, the contact shearing mechanism 42, and the contact transfer mechanism 45 are also operatively connected to and actuated by the main drive shaft 50, whereby when the clutch 55 is tripped, the main drive shaft 50 is driven through one revolution and actuates the welding electrode 40, the selective tape feed mechanism 41, the contact shearing mechanism 42, and the contact transfer mechanism 45 in a predetermined sequence. A second shaft 57 is driven from the motor 54 through means including a solenoid actuated one-revolution clutch 58, and the conveyor 36 is operatively connected to and actuated by the shaft 57 through a cam 59 and linkage 60 to remove from the carriage the finished article 22 with the contacts 20 welded thereon, and to feed another unfinished article 22 onto the carriage.

Figures 2, 3, 4:
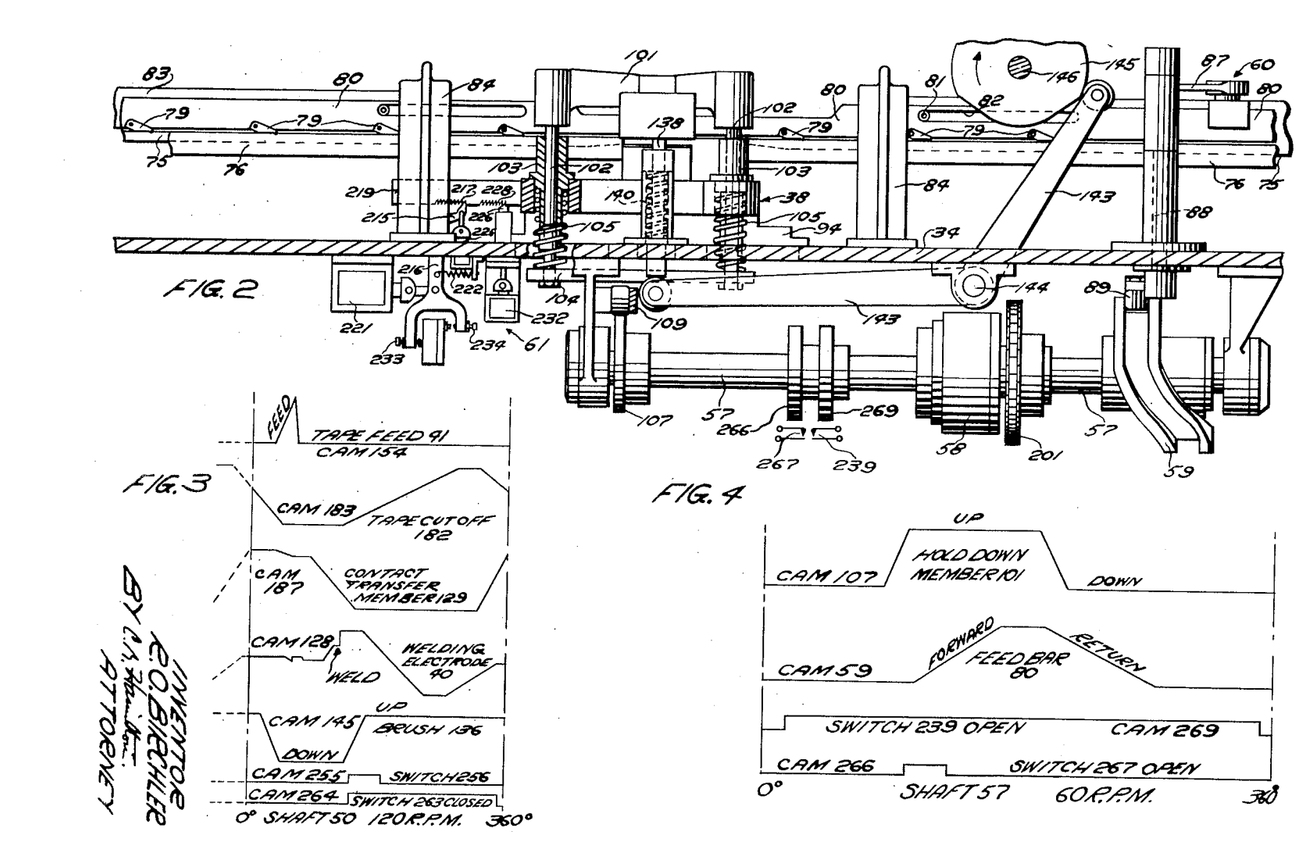
Fig. 2 is a fragmentary longitudinal vertical sectional view of the apparatus taken on line 2—2 of Fig. 1.
Figs. 3 and 4 are cam charts of cams actuated by two of the shafts of the apparatus.
Figure 10:
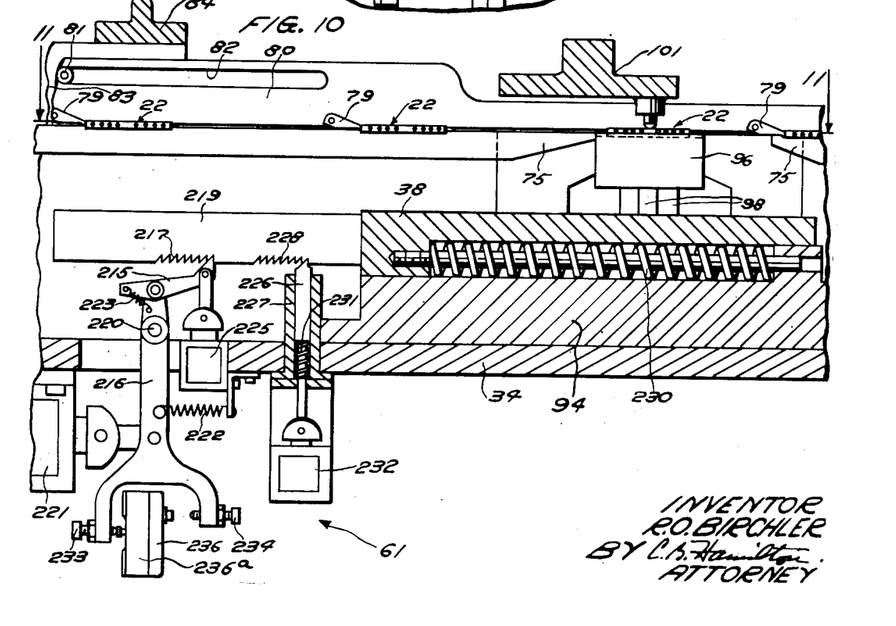
Fig. 10 is an enlarged fragmentary vertical longitudinal sectional view of the apparatus taken on line 10—10 of Fig. 1 showing a carriage for supporting the relay part and showing mechanism for indexing the carriage.

The carriage 38 is advanced step by step by a pawl and ratchet mechanism 61 (Figs. 2 and 10) to place successive wires 21 of the relay part 22 in welding position in alignment with the welding electrode or gun 40. A preselector control mechanism is provided including two sets of switches 69 and 70 settable to various positions to set up various control circuits to effect in a predetermined sequence: (1) the operation of the pawl and ratchet mechanism 61 to index the carriage 38 to successively align the wires 21 with the welding electrode 40; (2) the selection of the desired type of tape, 26–A, 26–B, or 26–C, to be fed for forming the selected types of contacts 20 to be welded onto the selected wires 21 of the article; (3) the tripping of the one-revolution clutch 55 and the rotation of the main drive shaft 50 to effect the welding of the contacts 20 onto the selected wires 21 of the article 22, the feeding of the tapes 26, the cutting of contacts 20 therefrom, and the transfer of the contacts to the electrode 40; and (4) the tripping of the one-revolution clutch 58 and the rotation of the drive shaft 57 after the contacts 20 have been welded to the article to effect the removal of the finished article 22 from the carriage and the feeding of an unfinished article thereon by the conveyor 36.

More specifically, the articles 22 are supported on a pair of rails 75 and 76 (Figs. 1 and 6) of the conveyor 36, which are supported on brackets 77. The rail 75 engages the wires 21 between the blocks 23 and 24 of the articles and serves to prevent displacement of the articles longitudinally of the wires 21. The articles 22 are advanced by feed pawls 79 (Figs. 2 and 10) carried on a reciprocable feed bar 80, which is supported by a plurality of rollers 81 riding in slots 82 in the feed bar. The rollers 81 are mounted on elongated stationary L-shaped frame members 83 which are supported by brackets 84 on the base plate 34. Reciprocation is imparted to the feed bar 80 by the cam 59 through the linkage 60 which is in the form of a lever 87 fixed to a vertical shaft 88 and connected to the feed bar 80, and a second lever 89 (Figs. 1, 2, and 6) fixed to the shaft 88 and actuated by the cam 59.

The carriage 38 is mounted for horizontal reciprocable movement on the ways 93 (Fig. 5) of a supporting block 94 secured to the base plate 34. Mounted on the carriage for horizontal movement therewith is a holder 96 which is guided for limited vertical movement on the carriage by guide members 97 and is urged upwardly by a spring 98 to its normal upper position (Fig. 10) level with the rails 75 and 76 of the conveyor 36 for receiving an article 22 as it is advanced by the conveyor. The rails 75 and 76 are each formed in two sections which are spaced apart to provide clearance for the horizontal movement of the holder 96 as the carriage 38 is indexed. A hold down or clamping member 101 is mounted on the carriage 38 for horizontal movement therewith and for vertical movement relative thereto for clamping the article 22 onto the holder 96 and moving the article and the holder to a lower operative position with the first wire 21 of the article in horizontal alignment with the electrode 40. A slotted guide 99 on the carriage 38 (Figs. 5 and 11) engages the ends of the wires 21 of the article 22 to accurately position them on the carriage, and a shoulder 100 on the holder 96 engages the end of the block 24 of the article 22 to support it against the impact of the electrode 40. The hold down member 101 is fixed to a pair of vertically disposed rods 102 (Figs. 1 and 2) which are slidable in tubular guides 103 on the carriage 38 and pass through clearance openings in the base plate 34. A cross bar 104 is secured to the lower ends of the rods 102 and springs 105 encircling the rods stress the bar 104 and the hold down member 101 for downward movement to clamp the article 22 on the holder 96 and to move them to their lower operative position. The hold down member 101 is moved upwardly by a cam 107 (Fig. 5) on the shaft 57, which cam actuates a lever 109 which is pivoted at 110 and has a roller 111 engageable with the cross bar 104.

The welding electrode 40 (Fig. 5) is supported for horizontal reciprocable movement in a U-shaped member 120 secured to the base plate 34 and is stressed for forward movement toward the carriage by an arm 123 of a torsion spring 124 mounted on the member 20. A cam follower 126 formed on one end of the welding electrode 40 engages the internal cam surface 127 of a cam 128 on the drive shaft 50 and the cam 128 in cooperation with the spring 123 moves the electrode 40 to a loading position where a contact 20 is inserted in the recess 47 of the electrode by a transfer member 129 of the contact transfer mechanism 45. The electrode 40 is then backed off a little and advanced to cause the contact 20 to bump against the transfer member 129 and be firmly seated in the electrode after which transfer member 129 is retracted and the electrode 40 is advanced to a predetermined position and released, causing the spring 123 to rapidly advance it and carry the contact 20 into engagement with the end of the wire 21 with an impact, thereby completing a welding circuit between the wire and the contact 20 to cause the contact to be percussively welded to the end of the wire 21.

Figure 1:
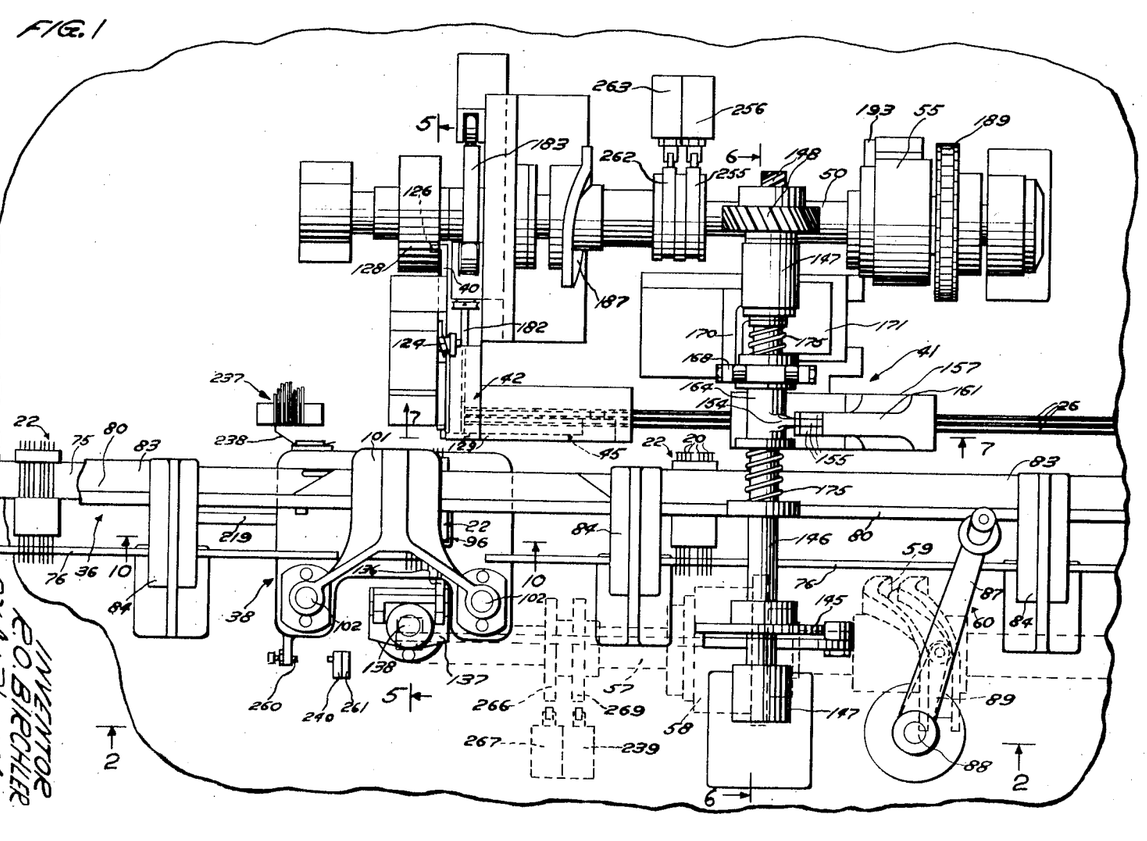
Fig. 1 is a fragmentary plan view of the tape selecting and welding apparatus.
Figure 6:
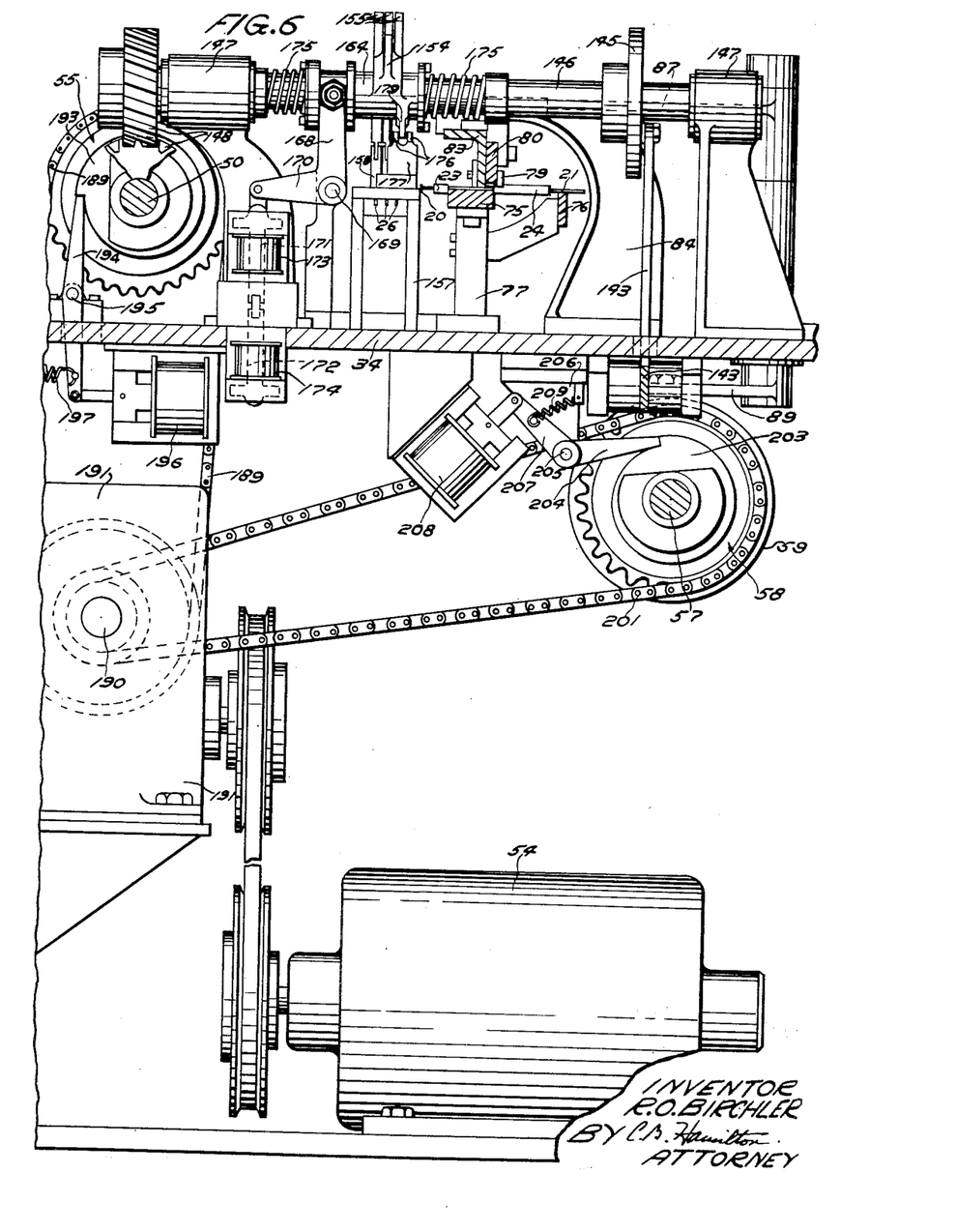
Fig. 6 is an enlarged vertical cross-sectional view of the apparatus taken on line 6—6 of Fig. 1.

An electronic device 133 (Fig. 5) for supplying welding current is connected by a conductor 134 to the electrode 40, and by a conductor 135 to a brush 136 which is moved into engagement with the wire 21 in alignment with the electrode 40 to supply welding current thereto, whereby when the contact 20 approaches the wire 21 an arc is produced which fuses the adjacent surfaces of the contact 20 and the wire 21 to weld them together as the contact is thrust against the wire. The brush 136 is mounted on a head 137 on the upper end of a rod 138 which is guided for vertical movement in a tubular guide 139 secured to the base plate 34. A spring 140 engaging an enlarged portion 141 on the rod stresses the rod 138 and the brush 136 downwardly to move the brush into engagement with a wire 21 and clamp it against an anvil 142 on the carriage to establish a good electrical connection with the wire 21. The brush 136 is raised by a bell crank lever 143 (Fig. 2) pivoted at 144 and actuated by a cam 145 on a shaft 146. This shaft is journalled in bearings 147 and is driven from the shaft 50 through a pair of spiral gears 148 (Figs. 1 and 6).

The shaft 146 also actuates the tape feeding mechanism 41 and has an actuating member or cam 154 splined thereon for individually actuating levers 155 (Figs. 6 and 7) of three tape feeding devices, one for each of the three types of tapes 26. These levers 155 are pivotally supported on a pin 156 in suitable frame 157 and have arms or jaws 158 pivotally connected thereto to form toggles. The arms 157 engage the upper portion of the tapes 26 and cooperate with arms or jaws 159 pivotally supported on a pin 160 and engageable with the underside of the tape. Leaf springs 161 and 162 secured to the frame 157 move the levers 155 and the arms 159 to normal retracted positions in engagement with stops 163 and 164, respectively. As the cam 154 rotates, it actuates the lever 155 of the tape feeding device aligned therewith and causes the toggle arm 158 thereof to grip the tape 26 against the arm 159 to advance the tape a predetermined distance into the tape shearing mechanism 42. The tapes 26 which are guided in suitable guideways 163 in the frame 157 are held against return movement by pivoted holding pawls 174.

The cam 154 has a hub portion 164 (Figs. 6 and 7) splined on the shaft 146 and the cam is shiftable into alignment with each of the levers 155 of the three tape feeding devices by a shifting yoke 168 which is pivotally supported at 169 and has an integral actuating lever 170. This lever is pivotally connected to one end of a pair of interconnected cores 171 and 172 of a pair of solenoids 173 and 174 suitably mounted on the base plate 34. The actuating cam 154 is yieldably maintained in a normal middle position in alignment with the lever 155 of the middle one of the three tape feeding devices by springs 175, and the cam 154 may be shifted to either side in alignment with the levers 155 of the other tape feeding devices by selective energization of the solenoids 173 and 174.

A pair of spaced lugs 176—176 (Figs. 6 and 7) are formed on a block 177 secured to the frame 157 and these lugs have beveled ends 178 and cooperate with a finger 179 on the hub of the cam 154 to guide the cam into three predetermined positions in accurate alignment with each of the selected tape feeding devices. This guide means supplements the cam shifting means to accurately position the cam 154 in its three positions to prevent more than one tape 26 being fed and more than one contact being formed at one time.

The tapes 26 are fed individually into apertures 180 in a die 181 (Fig. 11) of the tape shearing mechanism 42, and a punch 182 having a notch in the end thereof is actuated by a cam 183 (Fig. 1) on the shaft 50 to shear a contact from the tape and carry it in the notch to a predetermined position in the path of the transfer member 129 which transfers the contact 20 from the punch into the recess 47 of the electrode 40. The transfer member 129, which has a notched end for receiving the contact 20 sheared from the tape 26, is mounted for sliding movement in a suitable guideway and is connected to a lever 184 (Fig. 7) fixed to a shaft 185 which has a lever 186 engageable with a cam 187 (Fig. 1) on the main drive shaft 50 for actuating the transfer mechanism 45.

From the description thus far it will be seen that the welding electrode 40, the tape feeding mechanism 41, the tape shearing mechanism 42, and the contact transferring mechanism 45 are actuated in a predetermined sequence by the main drive shaft 50 so that in response to one complete revolution of the shaft 50 the electrode 40 is actuated to effect the welding of a contact 20 onto a wire 21 of the article, the tape feeding mechanism 41 feeds a selected one of the three tapes 26 a predetermined distance into the shearing mechanism 42, the shearing mechanism shears a contact 20 therefrom, and the transfer mechanism 45 transfers the contact to the welding electrode 40 preparatory to welding it onto the next selected wire 21 of the article 22 during the next cycle of operation of the shaft 50.

The one-revolution clutch 55 (Figs. 1 and 6), which drives the shaft 50, has a driving element which is connected through a sprocket and chain connection 189 to a shaft 190 of a gear reducer 191 which is driven from the motor 54. The clutch 55 has a control member 193 provided with a shoulder which is adapted to be engaged by a trip lever 194 for actuating the clutch to disengage its driving connection with the shaft 50. The trip lever 194 is pivotally supported at 195 on the base plate 34 and has a depending portion connected to the core of a solenoid 196 for disengaging the lever from the control member 193 to effect a driving connection between the clutch and the shaft 50 in response to energization of the solenoid. A spring 197 stresses the lever 194 into engagement with the periphery of the control member 193 to engage the shoulder thereon and thereby disengage the clutch to stop the shaft 50 after one revolution.

The shaft 57 for actuating the conveyor 36 is rotatable independently of the shaft 50. A driving member of the clutch 58 (Figs. 1, 2, and 6) is connected through a chain and sprocket connection 201 to the shaft 190 of the gear reducer 191. A control member 203 of the clutch 58 has a shoulder which is adapted to be engaged and actuated by a trip lever 204 to disconnect the drive and stop the shaft 57 after one revolution. The lever 204 is pivotally supported at 205 on a bracket 206 secured to the underside of the base plate 34 and an extension 207 of the lever 204 is connected to the core of a solenoid 208 which may be energized to disengage the lever 204 from the control member 203 to establish a driving connection with the shaft 57. A spring 209 returns the lever 204 and yieldably maintains it in engagement with the control member 203.

The pawl and ratchet feed mechanism 61 for indexing the carriage 38 and the article 22 from one position to another comprises a feed pawl 215 (Fig. 10) pivotally mounted on the upper end of an actuating lever 216 and having one end thereof engageable with the teeth of a ratchet 217 formed in a bar 219 secured to the carriage 38 and extending horizontally outwardly from one end thereof. The teeth of the ratchet are spaced apart distances corresponding to the distances between the wires 21 of the article 22. The actuating lever 216 is pivotally supported at 220 on the base plate 34 and the lower end of the lever is operatively connected to a solenoid 221 for actuating the lever and the feed pawl through a predetermined distance in one direction to index the carriage 38 one step. A spring 222 returns the lever 216. A spring 223 urges the feed pawl 215 into engagement with the teeth of the ratchet 217 and a solenoid 225 is operatively connected to one end of the feed pawl for retracting it to disengage the pawl from the ratchet 217. A holding pawl 226 mounted for vertical movement in a guide 227 engages the teeth in a ratchet 228 formed on the bar 219 for holding the carriage 38 in the various predetermined positions against movement in the opposite direction by a spring 230 which stresses the carriage for return movement to its first or starting position. The holding pawl 226 is moved into engagement with the ratchet 228 by a spring 231 and is operatively connected to a solenoid 232 for retracting the holding pawl to permit return movement of the carriage 38 to its first position. At its lower end the lever 216 is forked and has a pair of set screws 233 and 234 for actuating a switch 236 in response to oscillation of the lever.

The pre-selector control mechanism 65 is shown diagrammatically in Fig. 12 and includes the set of switches 69, eight in number, 69–1 to 69–8, corresponding to the eight wires 21 of the articles 22, and the set of switches 70, eight in number, 70–1 to 70–8. The switches 69 are settable to a first or no-weld position and to a second or weld position for controlling the welding of the contact onto selected ones of the wires 21 of the article 22, and the switches 70 are settable to three positions, 70–A, 70–B, and 70–C, for selecting the type of tape 26 from which contacts 20 are to be formed.

The switches 69 are individually connected to segments of a commutator 237 (Figs. 1 and 12) stationarily supported on the base plate 34 adjacent to the carriage 38. The commutator segments are spaced apart distances corresponding to the spacing of the wires 21 on the article 22 and are adapted to be engaged successively by a brush 238 which is mounted on the carriage 38 for movement therewith. The brush 238 is electrically connected through a cam actuated switch 239, a switch 240, switch 236, and a starting switch 241 to line 243 of a pair of power lines 243, 244. The switches 69 are settable to no-weld position in engagement with switch contacts 246 and to weld position in engagement with contacts 247. All of the switch contacts 246, except the contact 246 of the last switch 69-8, are connected in series with the indexing solenoid 221 to the power line 244. The switches 70 are connected individually to the contacts 247. When set in position 70-A the switches 70 are connected in series with the solenoid 173 and the solenoid 196, to the power line 244, when set in the position 70-B the switches 70 are connected directly to solenoid 196 and the power line 244, and when in position 70-C the switches 70 are connected in series with solenoids 174 and 196 to power line 244.

If we assume that the switches 69 of the preselector control mechanism 65 are all set to the weld position and the tape selector switches 70 are set to the intermediate position 70-B to weld contacts 20-B on each of the wires 21 of the article 22, the operation of the apparatus is as follows: Upon pressing the start switch 241, a relay 250 is energized to close the contacts 251 and lock itself in and also close contacts 252 connecting the motor 54 to power line 243, 244. A circuit is also completed from the power line 243 through switches 251, 236, 240, 239, brush 238, switch 69-1, switch 70-1, in position 70-B and solenoid 196 to power line 244, thus energizing the solenoid 196 and tripping the one-revolution clutch 55, thereby causing the shaft 50 to rotate through one revolution. During the rotation of the shaft 50, the welding electrode is actuated to weld to the first wire 21 of the article 22, a contact 20 which had previously been fed to the electrode, the tape feeding mechanism 41 is actuated to feed tape 26-B into the tape shearing mechanism 42, the tape shearing mechanism is actuated to shear a contact 20-B from the tape, the contact transfer mechanism 45 is actuated to transfer the contact 20-B to the welding electrode 40, and near the end of the cycle of rotation of the shaft 50 a cam 255 on the shaft momentarily closes an indexing switch 256. The closing of switch 256 completes a circuit from power line 243 through switches 251, 236, 240, 239, 256, indexing solenoid 221 to line 244 to energize the indexing solenoid and actuate the indexing mechanism and advance the carriage 38 and article 22 to the second position with the second wire 21 in welding position in alignment with the welding electrode 40.

With the carriage 38 in the second position the brush 238 engages the second segment of the commutator and a circuit is completed from the power line 243 through switches 251, 236, 240, 239, brush 238, switches 69-2 and 70-2, solenoid 196 to the power line 244 to energize the solenoid 196 and trip the one-revolution clutch to initiate another cycle of operation to effect the welding of a second contact 20-B onto the second wire 21 of an article 22, and the forming and feeding of another contact 20-B into the welding electrode. These cycles of operation are repeated until the carriage is indexed from its seventh to its eighth position, during which movement an arm 260 on the carriage 38 moves the switch 240 (Figs. 1 and 12) from engagement with switch contact 258 into engagement with switch contact 259. The switch 240 has a second switch 261 connected thereto for simultaneous actuation and the switch 261 is moved into and out of engagement with a switch contact 262 which is electrically connected to the switch contact 258 and the switch 239. The switches 240 and 261 are biased for movement to a normal position shown in Fig. 12. With the switches 240 and 261 in their changed position in contact with switch contacts 259 and 262, respectively, a circuit is completed from the power line 243 through switches 251, 236, 261, 239, brush 238, the eighth segment of the commutator 237, switch 69-8 and switch 70-8 in position 70-B, solenoid 196 to the power line 244, thus energizing the solenoid 196 to trip the one-revolution clutch 55 and cause another cycle of rotation of the shaft 50 and effect the welding of the eighth contact onto the eighth wire of the article 22. A second circuit is completed from the line 243, switches 251, 236, 240, switch contact 259, a switch 263 when this switch is closed by a cam 264 on the shaft 50, the solenoid 208 to power line 244, thus energizing the solenoid 208 and tripping the one-revolution clutch 58 and causing the shaft 57 to rotate one revolution, thereby actuating the conveyor 36 to transfer a finished article from the carriage 38 and to feed an unfinished article 22 thereon. At a predetermined interval of the rotation of the shaft 57 a cam 266 on the shaft 57 closes a switch 267 to complete a circuit from the power line 243, switches 251, 236, 240, switch contact 259, switches 263, 267, solenoids 232 and 221 to power line 244, thus energizing the solenoids 221 and 232 and retracting the feed and the holding pawls 215 and 226, respectively, and permitting the spring 230 to return the carriage 38 to its first position. A cam 269 on the shaft 57 maintains the switch 239 in closed position while the shaft is not rotating and opens this switch and allows it to remain open for the major portion of the rotation of the shaft to cut off the current from the brush 238 while it is being returned with the carriage to the first position.

The switch 236 is of the reset type, which remains in either of its two set positions until it is moved therefrom by the lever 216, whereupon it immediately snaps into the other position. A second switch 236a is connected thereto for simultaneous movement therewith and in response to energization of the indexing solenoid 221 the set screw 233 of the lever 216 actuates the switches 236 and 236a to their opposite position where they remain until the solenoid 221 is deenergized and the spring 222 returns the actuating lever 216 to its normal position, whereupon the set screw 234 actuates the switches 236 and 236a to their normal position shown in Fig. 12.

It is to be noted that during each cycle of operation of the main drive shaft 50 while a contact 20 is welded onto a wire 21 of the article 22 a selected contact tape 26 is also fed, a contact 20 is sheared therefrom and fed into the welding electrode 40 for welding onto the next selected wire 21 of the article 22 during the next cycle of operation. Therefore, if it is desired to selectively vary the types of contacts 20 to be welded onto the wires 21 of the article 22, the tape selector switch 70-1 electrically connected to switch 69-1 is set to select the desired type of tape 26 for the type of contact 20 to be welded onto the second wire of the article 22, the tape selector switch 70-2 connected to the switch 69-2 is set to select the desired type of tape 26 for the contact 20 to be welded onto the third wire 21 of the article 22, etc.

The weld switches 69 and the tape selector switches 70 of the pre-selector control system 68 may be set up to enable the apparatus to selectively form and weld selected types of contacts 20 onto selected wires 21 of the articles 22 in any combination desired. If it is desired to weld contacts 20-B, 20-A, 20-C, 20-A, and 20-C onto the first, second, sixth, seventh, and eighth wires of articles 22 (Fig. 13), the weld switches 69-1, 69-2, 69-6, 69-7, and 69-8 are set to weld positions, the other switches remaining in their no-weld positions, and the tape selector switches 70-1, 70-2, 70-6, 70-7, and 70-8 are set to positions 70-A, 70-C, 70-A, 70-C, 70-B, respectively, as shown in Fig. 12. Thus, while a switch 69 is set to effect the welding of a contact 20 onto one wire 21 of the article 22 the tape selector switch 70 electrically connected to this switch 69 is set to effect the selection and feeding of the tape for the contact 20 which is to be welded onto the next selected wire 21 of the article 22.

With the switches 69 and 70 set up as indicated above, with the carriage in its first position, and with a contact 20-B in the welding electrode 40, the brush 238 engages the first segment of the commutator 237, and after the start button 241 is pressed to energize relay 250 a circuit is completed from the power line 243, switches 251, 236, 240, 239, brush 238, switch 69–1, switch 70–1 set to position 70–A, solenoids 173 and 196, to line 244, thus energizing the solenoids 173 and 196. In response to energization of the solenoid 173 the tape feeding cam 154 is shifted into alignment with the tape feeding device for feeding contact tape 26–A, and in response to the energization of solenoid 196 the clutch 65 is tripped and causes the shaft 50 to rotate through one cycle of rotation and effect the welding of the contact 20–B in the electrode to the first wire 21 of the article 22, the feeding of selected contact 26–A into the tape shearing mechanism, the shearing of a contact 20–A from the tape, and the transfer of the contact 20–A into the notch 47 of the welding electrode 40, and the closing of the indexing switch 256. With the closing of the switch 256 the indexing solenoid 221 is energized to actuate the indexing lever 216 to advance the carriage 38 and the article 22 thereon to the second position with the second wire 21 of the article in welding position. At the end of the indexing stroke of the lever 216 the set screw 233 actuates the switch 236 to open position to deenergize the solenoid 221 and allow the spring 222 to return the lever 216 and actuate the switch 236 to closed position.

When the brush 238 engages the second segment of the commutator 237 another circuit is completed through switch 70–2 set to position 70–C, solenoids 174 and 196 to effect the shifting of the tape feeding cam 154 into position for feeding contact tape 26–C and to effect another cycle of operation of the shaft 50 during which the contact 20–A in the welding electrode 40 is welded to the second wire 21 of the article 22 and the contact tape 26–C is fed into the tape shearing mechanism, a contact tape 20–C sheared therefrom and transferred to the electrode 40, and the indexing switch 256 is again closed to energize the indexing solenoid 221 and cause another indexing movement. The solenoid 221 is automatically deenergized and the lever 216 returned to its normal position as explained above.

As the carriage is indexed to its third position the brush 238 engages the third segment of the commutator 237 and a circuit is completed from line 243 through switches 251, 236, 240, 239, brush 238, switch 69–3, indexing solenoid 221 to line 244, thus energizing the indexing solenoid to index the carriage and the article 22 to the fourth position. Since the switches 69–3, 69–4, and 69–5 are all set to no-weld positions, as the carriage is indexed to the third, fourth, and fifth positions, respectively, the brush 238 engages the corresponding segments and completes successive circuits through the indexing solenoid 221 to effect successive rapid indexing movements of the carriage 38 through these positions. When the carriage arrives at the sixth position and the brush 238 engages the sixth segment of the commutator, a circuit is established from power line 243 through switches 251, 236, 240, 239, brush 238, switch 69–6, switch 70–6 in position 70–A, solenoids 173 and 196 to line 244, thus energizing solenoids 173 and 196 to effect the shifting of the tape feeding cam 154 to the position for feeding tape 26–A and to effect another cycle of operation of the shaft 50 during which the contact 20–C in the electrode 40 is welded to the sixth wire 21 of the article 22, a tape 26–A is fed into the tape shearing mechanism, a contact 20–A is sheared from the tape and transferred to the electrode 40, and the indexing switch 256 is again closed to energize the indexing solenoid 221 and index the carriage 38 to its seventh position. In the seventh position the brush 238 establishes another circuit through the seventh segment of the commutator and the solenoids 174 and 196 to energize these solenoids and effect the shifting of the tape feeding cam 154 into position to feed contact tape 26–C and effect another cycle of operation of the shaft 50 during which the contact 20–A in the electrode 40 is welded to the seventh wire 21 of the article and the contact tape 26–C is fed and a contact 20–C sheared therefrom and transferred to the electrode 40.

When the carriage 38 is indexed from the seventh position to the eighth position, the arm 260 on the carriage actuates the switch 240 from engagement with the switch contact 258 into engagement with the switch contact 259 and actuates the switch 261 into engagement with switch contact 262. Thus, with the carriage in its eighth position a circuit is completed from the power line 243, through switches 251, 236, 261, 239, brush 238, eighth segment of the commutator 237, switch 69–8, switch 70–8 in position 70–B, solenoid 196 to line 244. Since neither one of the tape selector solenoids 173 and 174 was energized the tape feeding cam 154 remains in its central position for feeding the tape 26–B and in response to the energization of the solenoid 196 the one-revolution clutch 55 is tripped and the shaft 50 is again rotated through one cycle to effect the welding of the contact 20–C in the welding electrode 40 onto the eighth wire 21 of the article 22, the feeding of the tape 26–B, the shearing of a contact 20–B therefrom, and the transfer of the contact 20–B to the welding electrode 40. A second circuit is established from line 243, switches 251, 236, 240, switch contact 259, switch 263 when it is closed by the cam 264 on the shaft 50, solenoid 208 to line 244, thus energizing the solenoid 208 to trip the clutch 58 and cause the rotation of the shaft 57 through one revolution.

During the rotation of the shaft 57 the cam 107 thereon (Fig. 6) effects the raising of the hold down member 101, the holder 96 and the article 22 thereon to their upper position (Fig. 10), the cam 269 opens switch 239 to remove power from brush 238 for the major portion of cycle of shaft 57; the cam 266 closes the switch 267 to complete a circuit from power line 243, switches 251, 236, 240, contact 259, switches 263, 267, solenoids 232, 221, to line 244, to energize these solenoids and cause them to retract the feeding and the holding pawls 215 and 226 and effect the return movement of the carriage to the first position by the spring 230, the cam 59 actuates the feed bar 80 of the conveyor 36 to remove the finished article 22 from the carriage 38 and feed another unfinished article 22 onto the carriage and the holder 96, after which the cam 107 effects the movement of the hold down member 101, the holder 96 and the article 22 thereon to the lower position with the first wire 21 of the article 22 in welding position in alignment with welding electrode 40.

Means are provided for energizing the solenoid 208 to effect the rotation of the shaft 57 and the return of the carriage 38 to the first position when the welding apparatus is set up to process articles 22 on the eighth wire 21 of which no contact is to be welded. Thus, when the carriage 38 is in its eighth position, the switches 240 and 261 have been actuated by the arm 26 on the carriage 38 to their other positions in engagement with contacts 259 and 262, respectively, and when no contact is to be welded on the eighth wire 21 of the article 22, a circuit is completed from the power line 243, switches 251, 236, 240, switch contact 259, switch 236a, a timer 271 to the power line 244, and the timer 271, after a one-second delay, will close a switch 272 in parallel with the switch 263 to establish a circuit from power line 243, switches 251, 236, 240, contact 259, switch 272, solenoid 208 to line 244, thus energizing the solenoid 208 to trip the clutch 58 and cause the shaft 57 to be rotated through one cycle of operation. This effects the return of the carriage 38 to the first position, the removal of the finished article 22 from the carriage, and the feeding of another unfinished part 22 thereon as described hereinabove. The switch 272 is closed every time the carriage 38 is indexed to its eighth position but the timer 271 closes the switch 272 only after a one-second delay to provide sufficient time for completion of the cycle of operation of the shaft 50 and the welding of a contact onto a wire 21 when the welding apparatus is set up to weld a contact onto the eighth wire of the article 22.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for selectively welding contacts onto predetermined elements of an article, conveyor means for moving the article in a predetermined path into a plurality of predetermined positions to locate successive elements of the article in a welding position, a welding mechanism for welding contacts onto the elements of the article in welding position, means for selectively rendering said conveyor means inoperative to stop the article in selected predetermined positions for predetermined intervals, and means for rendering the welding mechanism operative to effect the welding of contacts onto predetermined elements of the article during said intervals.

2. In an apparatus for selectively welding contacts onto a plurality of elements of an article, indexing means for moving the article through a predetermined path into a plurality of predetermined positions to locate successive elements of the article in a welding position, means for welding contacts onto the elements of the article in the welding position, control means for each of said predetermined positions of the carriage selectively settable to first and second positions and effective in said first position for rendering the welding means inoperative and the indexing means operative to advance the article from one position to the next and effective in the second position for rendering the indexing means inoperative and the welding means operative to weld a contact onto an element of the article in welding position, and means operable in response to the actuation of the welding means for rendering the indexing means operable to advance the article from one position to the next.

3. In an apparatus for selectively welding contacts onto a plurality of elements of an article, means for moving the article through a predetermined path into a plurality of predetermined positions to locate successive elements of the article in a welding position, means for welding contacts onto the elements of the article in the welding position, a plurality of switches corresponding to said predetermined positions of the article moving means and selectively settable to first and second positions, means for sequentially connecting the switches to a current source in timed relation to the movement of the article moving means to said predetermined positions, means electrically connected to the switches in said first position for rendering the article moving means operable to advance the article from one predetermined position to the next, means electrically connected to the switches in said second position for rendering the welding means operable to weld a contact onto the element of the article in the welding position, and means operable in response to the actuation of the welding means for rendering the article moving means operable to advance the article from one of the said predetermined positions to the next.

4. In an apparatus for selectively welding contacts onto a plurality of elements of an article, a carriage for supporting an article for movement through a predetermined path, indexing means for moving the carriage successively into a plurality of predetermined positions to locate successive elements of the article in a welding position, means for welding contacts onto the elements of the article in the welding position, circuit means including a switch for each of said predetermined positions of the carriage selectively settable to two positions and effective in one position to render the welding means inoperative and the indexing means operative to advance the carriage to the next predetermined position and effective in the other position to render the indexing means inoperative and the welding means operative to weld a contact onto the element in a welding position whereby said switches may be selectively set to effect the welding of contacts onto selected elements of the article, means for sequentially connecting the switches and the circuit means associated therewith to a current source in timed relation to the movement of the carriage to the said predetermined positions, and means operable in response to the actuation of the welding means for rendering the indexing means operable to advance the carriage to the next predetermined position.

5. In an apparatus for selectively welding contacts onto a plurality of elements of an article, a carriage for supporting the article, indexing means for advancing the carriage to a plurality of predetermined positions to locate successive elements of the article in a welding position, a first solenoid for actuating the indexing means to advance the carriage from one position to the next, a welding mechanism including a control element for welding a contact onto the element of article in the welding position in response to actuation of the control element, a second solenoid for actuating the control element to effect the welding of contacts onto elements of the article in the welding position, a plurality of circuit means and switches corresponding to the predetermined positions of the carriage, commutator means for sequentially connecting the circuit means and switches to a current source in timed relation to the movement of the carriage to said predetermined positions, said switches being settable to selectively energize the first or the second solenoid at each position of the carriage to effect either an indexing movement of the carriage to the next position or the actuation of the welding mechanism, and means operable in response to the actuation of the welding mechanism for energizing the first solenoid to effect the indexing of the carriage to the next position.

6. In an apparatus for selectively welding contacts onto a plurality of elements of an article, a carriage for supporting the article, a feed pawl and ratchet means for advancing the carriage step by step from a first predetermined position to a plurality of other predetermined positions to locate successive elements on the article in a welding position, a holding pawl and ratchet means for holding the carriage in the said predetermined positions, a first solenoid for actuating the feed pawl and ratchet means, means for returning the carriage to the first predetermined position when the feed and the holding pawls are retracted, a welding mechanism including a control member for welding contacts onto the elements of the article in the welding position in response to actuation of the control member, a second solenoid for actuating the control member, a plurality of switches corresponding to said predetermined positions of the carriage, commutator means for sequentially connecting the switches to a current source in timed relation to the movement of the carriage to said predetermined positions, said switches being settable to selectively energize the first or the second solenoid at each of the said predetermined positions of the carriage to effect either an indexing movement of the carriage to the next position or the actuation of the welding mechanism, means operable in response to the actuation of the welding mechanism for energizing the first solenoid to effect the indexing of the carriage to the next position, and means responsive to the movement of the carriage to the last one of said predetermined positions for retracting the feed and the holding pawls to effect the return of the carraige to the said first predetermined position.

7. In an apparatus for selectively forming contacts and welding them onto selected elements of an article; a carriage for supporting the article; indexing means for moving said carriage successively from one to another of a plurality of predetermined positions to locate successive elements of the article in a welding position; means for welding contacts onto the elements of the article in the welding position; a plurality of tape feeding devices for feeding a plurality of different kinds of tape; means including a plurality of energizable devices for rendering selected feeding devices operative individually to feed a selected kind of tape; means for shearing a contact from the tape; means for transferring the contact to the welding means; drive means for actuating the operative tape feeding device to feed a selected tape, to actuate the tape shearing device to shear a contact from the tape, to actuate the transfer mechanism to transfer the contact to the welding means, and to actuate the welding means to weld a contact onto the element of the article in welding position; circuit means including a weld control switch for each of said predetermined positions of the carriage selectively settable to first and to second positions and effective in the first position to render the drive means inoperative and the indexing means operative to advance the carriage to the next predetermined position and effective in the second position to render the indexing means inoperative and the drive means operative to effect the actuation of the operative tape feeding device and the welding means, whereby said weld control switches may be selectively set to effect the welding of contacts onto selected elements of the article; commutator means for sequentially connecting the weld control switches and the circuit means connected therewith to a current source in timed relation to the movement of the carriage to said predetermined positions; means operable in response to the actuation of the drive means for rendering the indexing means operable to advance the carriage to the next predetermined position; and a plurality of tape selecting switches corresponding to the weld control switches and settable to different positions, said tape selecting switches being electrically connected to the corresponding weld control switches when said weld control switches are set in their second position and being electrically connected in their different positions to the different energizable devices whereby the tape selector switches may be set to effect the selective energization of the energizable devices to render selected tape feeding devices operative to feed selected types of tapes at the selected positions of the carriage.

8. In an apparatus for selectively welding contacts onto a plurality of elements of an article, a carriage for supporting an article, indexing means for advancing said carriage through predetermined positions to locate successive elements of the article in a welding position, a first energizable means for actuating the indexing means to advance the carriage from one position to the next, a welding mechanism including a control member for welding a contact onto the element of the article in a welding position in response to actuation of the control member, a second energizable means for effecting the actuation of the control member, a plurality of circuit components corresponding to the said predetermined positions of the carriage for controlling the energization of said first and said second energizable means, commutator means for sequentially connecting the circuit components to a current source in timed relation to the movement of the carriage to said predetermined positions, switch means in said circuit components settable to first and second positions and effective in said first position for rendering the second energizable means inoperative and the first energizing means operative to advance the carriage from one position to the next and effective in the second position for rendering said first energizing means inoperative and said second energizable means operative to effect the welding of a contact onto the element of the article in welding position, whereby said switch means may be selectively set to different positions to effect the welding of contacts onto selected elements of the article, and means operable in response to the actuation of the welding means for effecting the actuation of the indexing means to advance the carriage from one position to the next.

9. In an apparatus for selectively feeding tapes, a plurality of tape feeding devices in laterally disposed relation to each other for advancing the tapes individually, an actuator for operating said tape feeding devices one at a time, means mounting the actuator for movement from one feeding device to another, means for selectively positioning the actuator at selected ones of said tape feeding devices, and means for actuating the actuator to feed a selected tape.

10. In an apparatus for selectively feeding different kinds of tapes, a plurality of tape feeding devices in laterally disposed relation to each other for individually advancing the tapes, a member for actuating said tape feeding devices individually, means mounting said actuating member for rotation about a predetermined axis and for movement in an axial direction, means for shifting the actuating member axially for selectively positioning it in operative relation to selected ones of said tape feeding devices, and means for rotating said actuating member to actuate the selected tape feeding device.

11. In an apparatus for selectively feeding tapes, a plurality of tape feeding devices in laterally disposed relation to each other for advancing the tapes individually, a shaft, an actuating member mounted on said shaft for rotation therewith and for axial movement thereon into different operative positions for individually actuating said tape feeding devices, means for moving said actuating member to and yieldably holding it in a normal position in operative relation to one of said tape feeding means, means for selectively moving said actuating member from the normal position to another position in operative relation to another tape feeding means, and means for actuating said shaft.

12. In an apparatus for selectively feeding different kinds of tapes, a plurality of tape feeding devices adjacent to each other for advancing a plurality of tapes one at a time, a shaft, an actuating member mounted on said shaft for rotation therewith and axial movement thereon into different operative positions for individually actuating said tape feeding devices, resilient means for moving said actuating member to and yieldably hold it in a normal operative position for actuating one of said tape feeding devices, a plurality of electrical devices for moving the actuating member from said normal position to other positions in operative relation to the other tape feeding means, means for selectively energizing the electrical devices to move the actuating member to a selected operative position, and means for actuating said shaft.

13. In an apparatus for selectively feeding tapes, a plurality of tape feeding devices in laterally disposed relation to each other for advancing the tapes individually, an actuating member, means mounting the actuating member for rotation about a predetermined axis and for movement in an axial direction into different operative positions for individually actuating said tape feeding devices, means for moving said actuating member to and yieldably holding it in a normal position in operative relation to one of said tape feeding devices, means for selectively moving said actuating member from said normal position to another position in operative relation to another tape feeding means, and means for rotating the actuating member to actuate the selected tape feeding device.

14. In an apparatus for selectively welding contacts onto a plurality of elements of an article, a holder for supporting the article, indexing means for advancing the holder to a plurality of predetermined positions to locate successive elements of the article in a welding position, a first actuator for operating the indexing means to advance the holder from one position to the next, a welding mechanism for welding a contact onto the elements of the article in the welding position, a control member for effecting the actuation of the welding mechanism, a second actuator for actuating the control member to effect the welding of contacts onto elements of the article in the welding position, a plurality of circuits individual to the predetermined positions of the carriage, means for sequentially energizing the circuits in timed relation to the movement of the carriage to said predetermined positions, switches in said circuits settable to selectively render operative the first or the second actuators at each position of the carriage to effect either an indexing movement of the carriage to the next position or the actuation of the welding mechanism, and means operable in response to the actuation of the welding mechanism for rendering the first actuator operative to effect the indexing of the carriage to the next position.

15. In an apparatus for selectively forming different kinds of contacts and welding them onto selected ones of a plurality of elements of an article; means for moving the article into a plurality of predetermined positions to locate successive elements of the article in a welding position; a welder for welding the contacts onto the elements of the article in the welding position; means for shearing a contact from a contact tape and transferring it to the welder; a plurality of tape feeding devices for feeding different kinds of tape into the tape shearing means; tape selecting means including a plurality of switches, one for each of said predetermined positions of the article moving means selectively settable to different positions for rendering a selected one of said tape feeding devices operative; actuating means for actuating the operative tape feeding device to feed a selected tape into the shearing means, for actuating the tape shearing and transfer means to shear a contact and transfer it to the welder, and for actuating the welder to weld a contact onto the element of the article in welding position; a plurality of circuits and weld control switches individual to said predetermined positions of the article moving means and selectively settable to first and to second positions and effective in the first position to render the actuating means inoperative and the article moving means operative to advance the article to the next predetermined position, and effective in the second position to render the article moving means inoperative and the actuating means and the tape selecting means operative to effect the feeding of the selected type of tape, the shearing and transfer of a contact, and the welding of a contact onto an element of the article; and means for sequentially energizing the weld control switches and the circuit connected thereto in timed relation to the movement of the article moving means to said predetermined positions.

References Cited in the file of this patent

UNITED STATES PATENTS

| | | |
|---|---|---|
| 2,184,765 | Farley et al. | Dec. 26, 1939 |
| 2,401,722 | Clapp et al. | June 11, 1946 |
| 2,668,219 | Sandberg et al. | Feb. 2, 1954 |
| 2,684,423 | Hipple | July 20, 1954 |